United States Patent
Wang et al.

(10) Patent No.: US 11,906,315 B2
(45) Date of Patent: Feb. 20, 2024

(54) ELECTRIC VEHICLE TRIP ENERGY PREDICTION BASED ON BASELINE AND DYNAMIC DRIVER MODELS

(71) Applicant: GM GLOBAL TECHNOLOGY OPERATIONS LLC, Detroit, MI (US)

(72) Inventors: Yue-Yun Wang, Troy, MI (US); Dongxu Li, Troy, MI (US); Brandon D. Mazzara, Grosse Pointe Shores, MI (US); Jonathan Wilson, Rochester Hills, MI (US); Chen-Fang Chang, Bloomfield Hills, MI (US); Chunhao J. Lee, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 87 days.

(21) Appl. No.: 17/562,171

(22) Filed: Dec. 27, 2021

(65) Prior Publication Data
US 2023/0204369 A1  Jun. 29, 2023

(51) Int. Cl.
*G01C 21/34* (2006.01)
*B60W 40/00* (2006.01)

(52) U.S. Cl.
CPC ......... *G01C 21/3469* (2013.01); *B60W 40/00* (2013.01)

(58) Field of Classification Search
CPC ............................. G01C 21/3469; B60W 40/00
See application file for complete search history.

(56) References Cited

U.S. PATENT DOCUMENTS

| | | | |
|---|---|---|---|
| 11,567,503 B1 * | 1/2023 | Roy | G01C 21/3492 |
| 2002/0059017 A1 * | 5/2002 | Yamane | G08G 1/0104 |
| | | | 701/1 |
| 2008/0027613 A1 * | 1/2008 | Bai | F16H 61/0213 |
| | | | 701/55 |
| 2011/0022255 A1 * | 1/2011 | Yamada | B60K 6/46 |
| | | | 180/65.265 |
| 2013/0261914 A1 * | 10/2013 | Ingram | B64D 27/24 |
| | | | 701/423 |
| 2015/0360688 A1 * | 12/2015 | Tanaka | B60W 30/143 |
| | | | 701/93 |
| 2017/0120890 A1 * | 5/2017 | Payne | B60W 50/0097 |
| 2018/0238698 A1 * | 8/2018 | Pedersen | G06N 5/048 |
| 2018/0293595 A1 * | 10/2018 | McMaster | G01C 21/3626 |

(Continued)

*Primary Examiner* — Fadey S. Jabr
*Assistant Examiner* — Naeem Taslim Alam

(57) ABSTRACT

A trip energy estimation system includes a memory and a control module. The memory stores average traffic speed, average traffic acceleration, driver speed, and driver acceleration data. The control module executes an algorithm to estimate an amount of energy for an electric vehicle to travel between two locations. The algorithm includes: determining, based on the average traffic speed data and the average traffic acceleration data, a baseline amount of energy for the electric vehicle to travel between the two locations; determining, based on the driver speed data and the driver acceleration data, a dynamic amount of energy corresponding to at least one of stop and go events, over speeding, or under speeding; and determining a total amount of energy based on the baseline amount of energy and the dynamic amount of energy. The control module, based on the total amount of energy, performs an operation including indicating a trip estimate.

18 Claims, 10 Drawing Sheets

(56) References Cited

U.S. PATENT DOCUMENTS

| | | | |
|---|---|---|---|
| 2019/0049260 A1* | 2/2019 | Gaither | B60W 40/00 |
| 2019/0092185 A1* | 3/2019 | Ogawa | G01C 21/3469 |
| 2020/0072626 A1* | 3/2020 | Kumar | G01C 21/3676 |
| 2020/0108829 A1* | 4/2020 | Bauer | G08G 1/0141 |
| 2020/0271470 A1* | 8/2020 | Symanow | B60W 20/12 |
| 2021/0116927 A1* | 4/2021 | Kang | G01C 21/3492 |
| 2021/0131812 A1* | 5/2021 | Gong | G01C 21/3453 |
| 2021/0213933 A1* | 7/2021 | Borrelli | B60K 6/485 |
| 2021/0300189 A1* | 9/2021 | Treadway | H04W 4/46 |
| 2021/0333119 A1* | 10/2021 | Ramesh | B60W 50/06 |
| 2022/0026228 A1* | 1/2022 | Kasioumis | G01C 21/3469 |
| 2022/0180316 A1* | 6/2022 | Espig | G06Q 10/06393 |
| 2023/0001824 A1* | 1/2023 | Shaotran | H01M 10/486 |
| 2023/0066396 A1* | 3/2023 | Lee | B60L 8/003 |

\* cited by examiner

ELECTRIC VEHICLE TRIP ENERGY PREDICTION BASED ON BASELINE AND DYNAMIC DRIVER MODELS

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric vehicles, and more particularly, to energy usage between origin and destination.

An electric vehicle includes a battery pack and one or more motors that are powered by the battery back for propulsion purposes. The battery pack provides power to various vehicle systems including a propulsion system, lighting systems, infotainment systems, air-conditioning systems, braking systems, steering systems, autonomous control systems, navigation systems, etc. The propulsion system may include the one or more motors for driving wheels of the vehicle.

SUMMARY

A trip energy estimation system is disclosed and includes a memory and a control module. The memory is configured to store average traffic speed data, average traffic acceleration data, driver speed data, and driver acceleration data. The control module is configured to execute an algorithm to estimate an amount of energy for an electric vehicle to travel from a first location to a second location. The algorithm includes: determining, based on the average traffic speed data and the average traffic acceleration data, a baseline amount of energy for the electric vehicle to travel from the first location to the second location; determining, based on the driver speed data and the driver acceleration data, a dynamic amount of energy corresponding to at least one of (i) stop and go events, (ii) over speeding, or (iii) under speeding; and determining a total amount of energy based on the baseline amount of energy and the dynamic amount of energy. The control module is configured, based on the total amount of energy, to perform one or more operations including indicating a trip estimate. The control module may indicate the trip estimate to a system operator.

In other features, the driver speed data and the driver acceleration data is specific to a particular driver.

In other features, the control module is configured to determine the dynamic amount of energy for the stop and go events, over speeding and under speeding.

In other features, the control module in determining the dynamic amount of energy for the stop and go events: projects path information onto a plot of average traffic speed; determines, based on the projection, how many stop and go events occur along a route from the first location to the second location; sums up the energy associated with decelerating and accelerating associated with each of the stop and go events to provide a sum; and determines the dynamic amount of energy based on the sum.

In other features, the control module in determining the dynamic amount of energy for at least one of the over speeding or the under speeding: determines differences between the average traffic speed data and the driver speed data; determines, based on the differences, percentage increases or percentage decreases in the dynamic amount of energy; and determines the dynamic amount of energy based on the percentage increases or percentage decreases.

In other features, the control module in determining the dynamic amount of energy: projects path information onto a plot of average traffic speed; determines, based on the projection, the number of stop and go events; sums up the energy associated with decelerating and accelerating associated with each of the stop and go events to provide a sum; determines differences between the average traffic speed data and the driver speed data; determines, based on the differences, percentage increases or percentage decreases in the dynamic amount of energy; and determines the dynamic amount of energy based on the sum and the percentage increases or percentage decreases.

In other features, the control module is configured to: implement a statistical learning model of acceleration of a driver, wherein the driver is the system operator or another individual; and determine the dynamic amount of energy based on the statistical learning model.

In other features, the control module is configured to: perform a recursive algorithm to learn acceleration behavior of a driver, where the driver is the system operator or another individual; and determine the dynamic amount of energy based on the learned acceleration behavior of the driver.

In other features, the control module is configured to: determine a categorical acceleration style of a driver, where the driver is the system operator or another individual; and determine the dynamic amount of energy based on the categorical driving style of the driver.

In other features, the control module is configured to: determine an average acceleration of a driver; compare the average acceleration of the driver to categorical acceleration values for different categorical acceleration styles to determine whether to perform interpolation; in response to the average acceleration of the driver not matching one of the categorical acceleration values, perform interpolation to estimate stop and go energy levels or estimate the stop and go energy levels directly from a vehicle model; and determine the dynamic amount of energy based on the estimated stop and go energy levels.

In other features, a trip energy based estimation method is provided and includes: obtaining average traffic speed data, average traffic acceleration data, driver speed data, and driver acceleration data; and executing an algorithm to estimate an amount of energy for an electric vehicle to travel from a first location to a second location. The algorithm includes: determining, based on the average traffic speed data and the average traffic acceleration data, a baseline amount of energy for the electric vehicle to travel from the first location to the second location; determining, based on the driver speed data and the driver acceleration data, a dynamic amount of energy corresponding to at least one of (i) stop and go events, (ii) over speeding, or (iii) under speeding; and determining a total amount of energy based on the baseline amount of energy and the dynamic amount of energy. The method further includes, based on the total amount of energy, performing one or more operations including indicating a trip estimate. The trip estimate may be indicated to a system operator.

In other features, the driver speed data and the driver acceleration data is specific to a particular driver.

In other features, the method further includes determine the dynamic amount of energy for the stop and go events, over speeding and under speeding.

In other features, determining the dynamic amount of energy for the stop and go events includes: projecting path information onto a plot of average traffic speed; determining, based on the projection, how many stop and go events occur along a route from the first location to the second location; summing up the energy associated with decelerating and accelerating associated with each of the stop and go events to provide a sum; and determining the dynamic amount of energy based on the sum.

In other features, determining the dynamic amount of energy for at least one of the over speeding or the under speeding includes: determining differences between the average traffic speed data and the driver speed data; determining, based on the differences, percentage increases or percentage decreases in the dynamic amount of energy; and determining the dynamic amount of energy based on the percentage increases or percentage decreases.

In other features, determining the dynamic amount of energy includes: projecting path information onto a plot of average traffic speed; determining, based on the projection, the number of stop and go events; summing up the energy associated with decelerating and accelerating associated with each of the stop and go events to provide a sum; determining differences between the average traffic speed data and the driver speed data; determining, based on the differences, percentage increases or percentage decreases in the dynamic amount of energy; and determining the dynamic amount of energy based on the sum and the percentage increases or percentage decreases.

In other features, the method further includes: implementing a statistical learning model of acceleration of a driver, wherein the driver is the system operator or another individual; and determining the dynamic amount of energy based on the statistical learning model.

In other features, the method further includes: performing a recursive algorithm to learn acceleration behavior of a driver, where the driver is the system operator or another individual; and determining the dynamic amount of energy based on the learned acceleration behavior of the driver.

In other features, the method further includes: determining a categorical acceleration style of a driver, where the driver is the system operator or another individual; and determining the dynamic amount of energy based on the categorical driving style of the driver.

In other features, the method further includes: determining an average acceleration of a driver; comparing the average acceleration of the driver to categorical acceleration values for different categorical acceleration styles to determine whether to perform interpolation; in response to the average acceleration of the driver not matching one of the categorical acceleration values, performing interpolation to estimate stop and go energy levels or estimate the stop and go energy levels directly from a vehicle model; and determining the dynamic amount of energy based on the estimated stop and go energy levels.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may be equipped with a trip energy prediction device for estimating the amount of energy for a vehicle to travel from a first location (or origin) to a second location (or destination). As an example, a trip energy prediction device may include a driver model that is used for navigation and charge planning of all drivers. The trip energy prediction values may be the same for all drivers. Such a device is inaccurate and can lead to as much as 20% prediction error due to different driving styles and changing traffic conditions. As a result, the device may indicate that the vehicle has enough remaining energy to make a non-stop trip and due to the predicted error may need to be charged along the route prior to reaching the destination.

The examples set forth herein include categorical driver models, personalized (or driver specific) driver models, and energy estimation algorithms for accurately estimating total trip energy. The total trip energy is based on a baseline driver model and a dynamic driving model. The baseline driving model captures energy for a driver of a vehicle traveling at an average speed and exhibiting an average amount of acceleration throughout the trip. The dynamic driving model captures differences between (i) energy usage associated with the baseline driving model, and (ii) energy usage associated with estimated and/or predicted driving of the driver. The differences are due to different driving styles and behaviors of the driver relative to an average driver and on-road traffic conditions, which may vary relative to predicted traffic conditions. The disclosed examples improve accuracy of trip propulsion energy prediction (e.g. within an error of less than 5% for an individual driver) as compared with that of simply a baseline model.

The examples include a recursive algorithm that learns individual driver accelerating, decelerating and speeding style. A dynamic driving model is provided as a function of learned driving style and traffic information. The dynamic driving model is used to predict energy usage differences of individual drivers for a given route, which allows for improved prediction of when a host vehicle will need to be charged and/or whether a non-stop trip, without charging along the route, is possible. The energy usage for an individual driver may refer to energy usage: when the individual driver is driving the vehicle directly and the vehicle is not being operated in a semi-autonomous or fully autonomous driving mode; when the individual driver is driving the vehicle in a semi-autonomous driving mode; and/or when the individual is in the driver seat and the vehicle is being driven in a fully autonomous driving mode.

Figure 1:
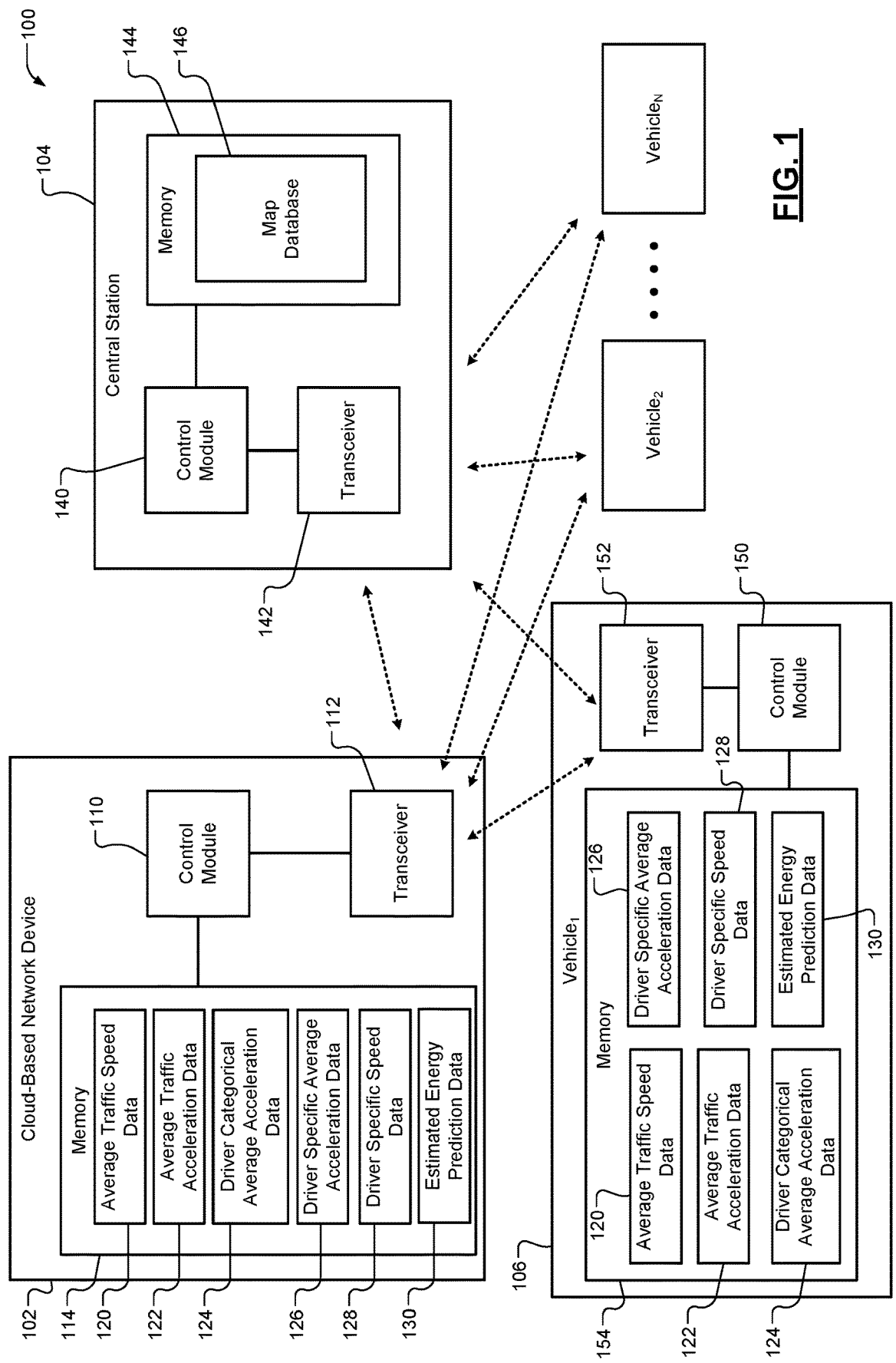
FIG. 1 is a functional block diagram of an example of a portion of a trip energy prediction system according to the present disclosure.
Figure 2:
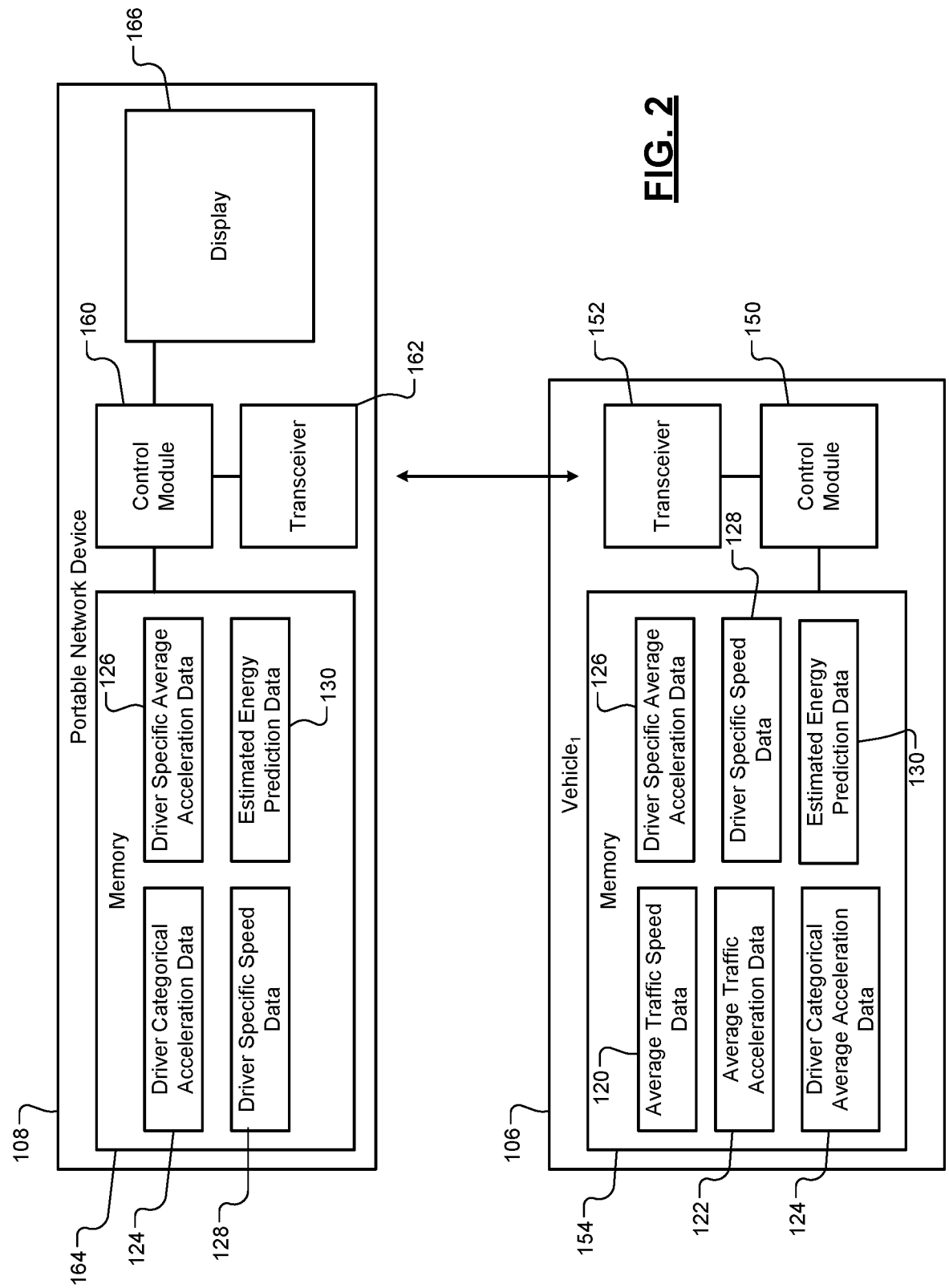
FIG. 2 is a function block diagram of an example of another portion of the trip energy prediction system of FIG. 1.

FIGS. 1-2 show a trip energy prediction and estimation system 100 that may include a cloud-based network device 102, a central station 104, a vehicle 106 and a portable network device 108. The cloud-based network device 102 may be implemented as a server of a cloud-based network and include a control module 110, a transceiver 112, and a memory 114. The memory 114 may store average traffic speed data 120, average traffic acceleration data 122, driver categorical average acceleration data 124, driver specific average acceleration data 126, driver specific speed data 128, and estimated energy prediction data 130. The data 120, 122, 124, 126, 128, 130 may be collected, determined, and/or stored at and/or shared with any of the cloud-based network device 102, the central station 104, the vehicle 106 and the portable network device 108. In an embodiment, the portable network device 108 stores the data 124, 126, 128, 130 and not the data 120, 122. The portable network device 108 may be a mobile phone, a wearable device, a tablet, a laptop computer, etc.

The central station 104 may include a control module 140, a transceiver 142 and memory 144 storing a map database 146. The map database 146 may store traffic information as well as path information. Traffic information may include levels of congestion at various locations, average traffic speeds for various locations and routes, average traffic acceleration for routes, and other traffic related information, such as weather conditions, locations of collisions, etc. Path information may include locations and types of traffic lights, locations and types of traffic signs, road curvature locations, etc.

The vehicle 106 may include a control module 150, a transceiver 152 and a memory 154. The memory 154 may store the data 120, 122, 124, 126, 128 and 130. Multiple vehicles$_{1-N}$ are shown, where vehicles$_{2-N}$ may be configured and operate similarly as vehicle 106. The transceiver 152 may be in communication with the transceivers 112, 142. The portable network device may include a control module 160, a transceiver 162, a memory 164 and a display 166 (e.g., a touchscreen).

Figure 3:
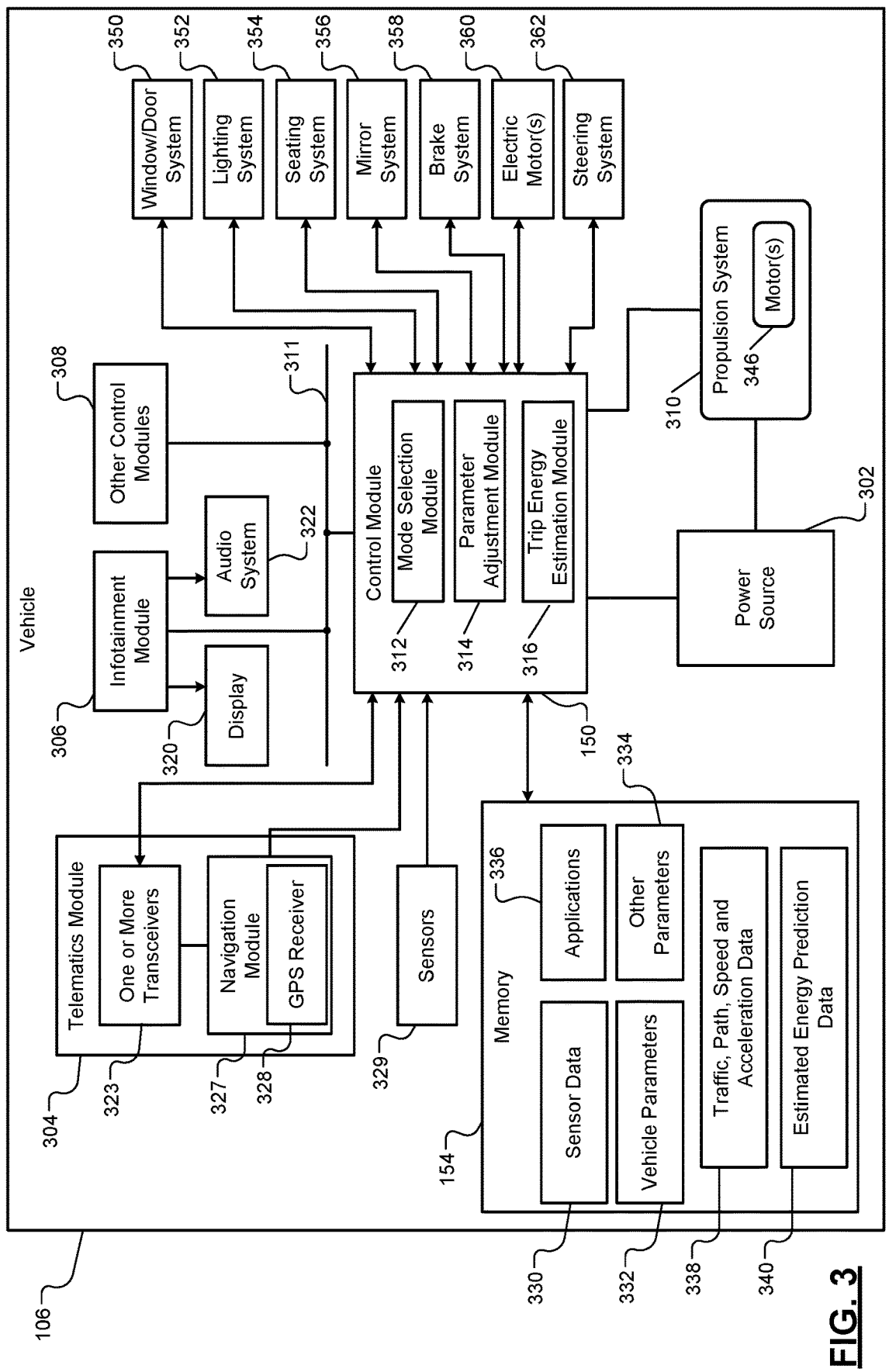
FIG. 3 is a functional block diagram of an example of a vehicle including a trip energy estimation module according to the present disclosure.

FIG. 3 shows the vehicle 106 that includes the control module 150, a power source 302, a telematics module 304, an infotainment module 306, other control modules 308 and a propulsion system 310. The control module 150 may control operation of the vehicle 106 and the modules 304, 304, 306, 308 and the propulsion system 310. The power source 302 may include one or more battery packs, a generator, a converter, a control circuit, terminals for high and low voltage loads, etc.

The telematics module 304 provides wireless communication services within the vehicle 106 and wirelessly communicates with service providers. The telematics module 304 may support Wi-Fi®, Bluetooth®, Bluetooth Low Energy (BLE), near-field communication (NFC), cellular, legacy (LG) transmission control protocol (TCP), long-term evolution (LTE), and/or other wireless communication and/or operate according to Wi-Fi®, Bluetooth®, BLE, NFC, cellular, and/or other wireless communication protocols. The telematics module 304 may include one or more transceivers 323 and a navigation module 327 with a global positioning system (GPS) 328. The transceivers 323 wirelessly communicate with network devices internal and external to the vehicle 106 including the cloud-based network device 102, the central station 104 and the portable network device 108 of FIGS. 1-2. The transceivers 323 may perform pattern recognition, channel addressing, channel access control, and filtering operations.

The navigation module 327 executes a navigation application to provide navigation services. The navigation services may include location identification services to identify where the vehicle 106 is located. The navigation services may also include guiding a driver and/or directing the vehicle 106 to a selected location. The navigation module 327 may communicate with the central station 104 to collect traffic map information indicating traffic and path information. As an example, if the vehicle 106 is an autonomous vehicle, the navigation module 327 may direct the control module 150 along a selected route to a selected destination. The GPS receiver 328 may provide vehicle velocity and/or direction (or heading) of the vehicle and/or global clock timing information.

The infotainment module 306 may include and/or be connected to an audio system 322 and/or a video system including one or more displays (one display 320 is shown) to provide trip energy information, vehicle status information, diagnostic information, prognostic information, entertainment features, etc. The infotainment module 306 may be used to guide a vehicle operator to a certain location, indicate trip energy estimations and other related trip energy information. The other related trip energy information may include whether a non-stop trip may be taken with a remaining amount of stored energy in the power source 302 and/or an available amount of stored energy (percentage of total remaining energy) permitted to be utilized for propulsion purposes. The propulsion system 310 may include one or more electric motors 346 to propel the vehicle 106.

The modules 150, 304, 306, 308 may communicate with each other via one or more buses 311, such as a controller area network (CAN) bus and/or other suitable interfaces. The control module 150 may control operation of vehicle modules, devices and systems based on feedback from sensors 329. The sensors 329 may include sensors, cameras, objection detection sensors, temperature sensors, accelerometers, a vehicle velocity sensor, and/or other sensors.

The control module 150 may include a mode selection module 312, a parameter adjustment module 314, and a trip energy estimation module 316. The mode selection module 312 may select a vehicle operating mode. The parameter adjustment module 314 may be used to adjust parameters of the vehicle 106. The trip energy estimation module 316 may estimate trip energy for the vehicle 106 to travel between locations. This may be driver categorical based and/or driver specific, as further described below. The categories may include aggressive, normal and economical driving categories, which may have associated vehicle speeds, average vehicle speeds, accelerations, and/or average accelerations for certain driving routes, time of day, traffic conditions, etc.

The vehicle 106 may further include the memory 154. The memory 154 may store sensor data 330 and/or vehicle parameters 332, other parameters 334 (e.g., battery pack state of charge or remaining energy), and applications 336 (e.g., a trip energy estimation application). The applications 336 may include applications executed by the modules 150, 304, 306, 308. Although the memory 154 and the control module 150 are shown as separate devices, the memory 154 and the control module 150 may be implemented as a single device. The memory 154 may also store traffic, path, speed and acceleration data 338 such as that referred to herein and estimated energy prediction data 340 such as that referred to herein.

The control module 150 may control operation of a window/door system 350, a lighting system 352, a seating system 354, a mirror system 356, a brake system 358, electric motors 360 and/or a steering system 362 according to parameters set by the modules 150, 304, 306, 308.

The control module 150 may set some of the parameters based on signals received from the sensors 329. The control module 150 may receive power from the power source 302, which may be provided to the propulsion system 310, the window/door system 350, the lighting system 352, the seating system 354, the mirror system 356, the brake system 358, the electric motors 360 and/or the steering system 362, etc. Some of the vehicle control operations may include unlocking doors of the window/door system 350, starting the electric motors 360, powering any of the modules 304, 306, 308, 327 and the systems 322, 350, 352, 354, 356, 358, 362, and/or performing other operations as are further described herein.

Power supplied to the motors 346, window/door system 350, the lighting system 352, the seating system 354, the mirror system 356, the brake system 358, the electric motors 360 and/or the steering system 362 and/or actuators thereof may be controlled by the control module 150 to, for example, adjust: motor speed, torque, and/or acceleration; braking pressure; steering wheel angle; pedal position; door locks and window positions; seat angles; etc. This control may be based on the outputs of the sensors 329, the navigation module 327, the GPS receiver 328 and the data and information stored in the memory 154.

The control module 150 may determine various parameters including a vehicle speed, a motor speed, a gear state, an accelerator position, a brake pedal position, an amount of regenerative (charge) power, an amount of auto start/stop discharge power, and/or other information. The other information may include: priority levels of loads on the power source 302; power, current and voltage demands for each source terminal; etc. The control module 150 may share this information and the vehicle operating mode with the power source 302.

The power source 302 and/or a control circuit thereof may determine other parameters, such as: an amount of charge power at each source terminal; an amount of discharge power at each source terminal; maximum and minimum voltages at source terminals; maximum and minimum voltages at power rails, cells, blocks, packs, and/or groups; SOX values of cells, blocks, packs, and/or groups; temperatures of cells, blocks, packs, and/or groups; current values of cells, blocks, packs, and/or groups; power values cells, blocks, packs, and/or groups; etc. The acronym "SOX" refers to a state of charge (SOC), a state of health (SOH), state of power (SOP), and/or a state of function (SOF). Power, voltage and/or current sensors may be included separate from and/or in the power source 302 for SOX determinations. The SOC of a cell, pack and/or group may refer to the voltage, current and/or amount of available power stored in the cell, pack and/or group. The SOH of a cell, pack and/or group may refer to: the age (or operating hours); whether there is a short circuit; whether there is a loose wire or bad connection; temperatures, voltages, power levels, and/or current levels supplied to or sourced from the cell, pack and/or group during certain operating conditions; and/or other parameters describing the health of the cell, pack and/or group. The SOF of a cell, pack and/or group may refer to a current temperature, voltage, and/or current level supplied to or sourced from the cell, pack and/or group, and/or other parameters describing a current functional state of the cell, pack and/or group. The power source 302 may determine connected configurations of the cells and corresponding switch states as described herein based on the parameters determined by the control module 150 and/or the control circuit (or module) of the power source 302.

The following examples and/or portions thereof may be implemented by one or more of the control modules 110, 140, 150, 160 and the trip energy estimation module 316 of FIGS. 1-3. Although FIGS. 1-3 show the control module 150 of the vehicle including the trip energy estimation module 316, the control modules 110, 140, and 160 may implement a same or similar module. Also, the trip energy estimation module 316 may be implemented in the navigation module 327 and share any collected and/or determined information with the control module 150.

The trip energy estimation modules may determine, track and/or learn each driver's acceleration style and speed style. This may be performed for each driver and each vehicle. The acceleration style refers to typical acceleration rates and deceleration rates of a driver. The speed style refers to whether a driver typically drives over authorized traffic speed limits, at the traffic speed limits, or under the traffic speed limits including how much over and how much under the traffic speed limits. The trip energy estimation modules may implement machine learning algorithms to track and update this information for each driver of each vehicle of concern. This information is learned with statistical significance. The machine learning algorithms may be used to characterize each driver's driving style. This characterization may be route based and/or time of day based.

The trip energy estimation modules may implement recursive algorithms, an example of which is described below, to learn individual driver acceleration styles. Route traffic and path information may be projected onto average traffic speed plots to determine where stop and go events occur to account for the energy used during each of the stop and go events. This is further described below.

The trip energy estimation modules implement dynamic driving models formulated as functions of learned driving styles with the associated traffic and path information. The dynamic driving models are used to calculate dynamic energy usage of individual drivers. Trip energy for an electric vehicle to travel from a first location to a second location is predicted based on the dynamic energy usage and is a sum of a baseline energy and the dynamic driving energy. This is also further described below.

Figure 4A:
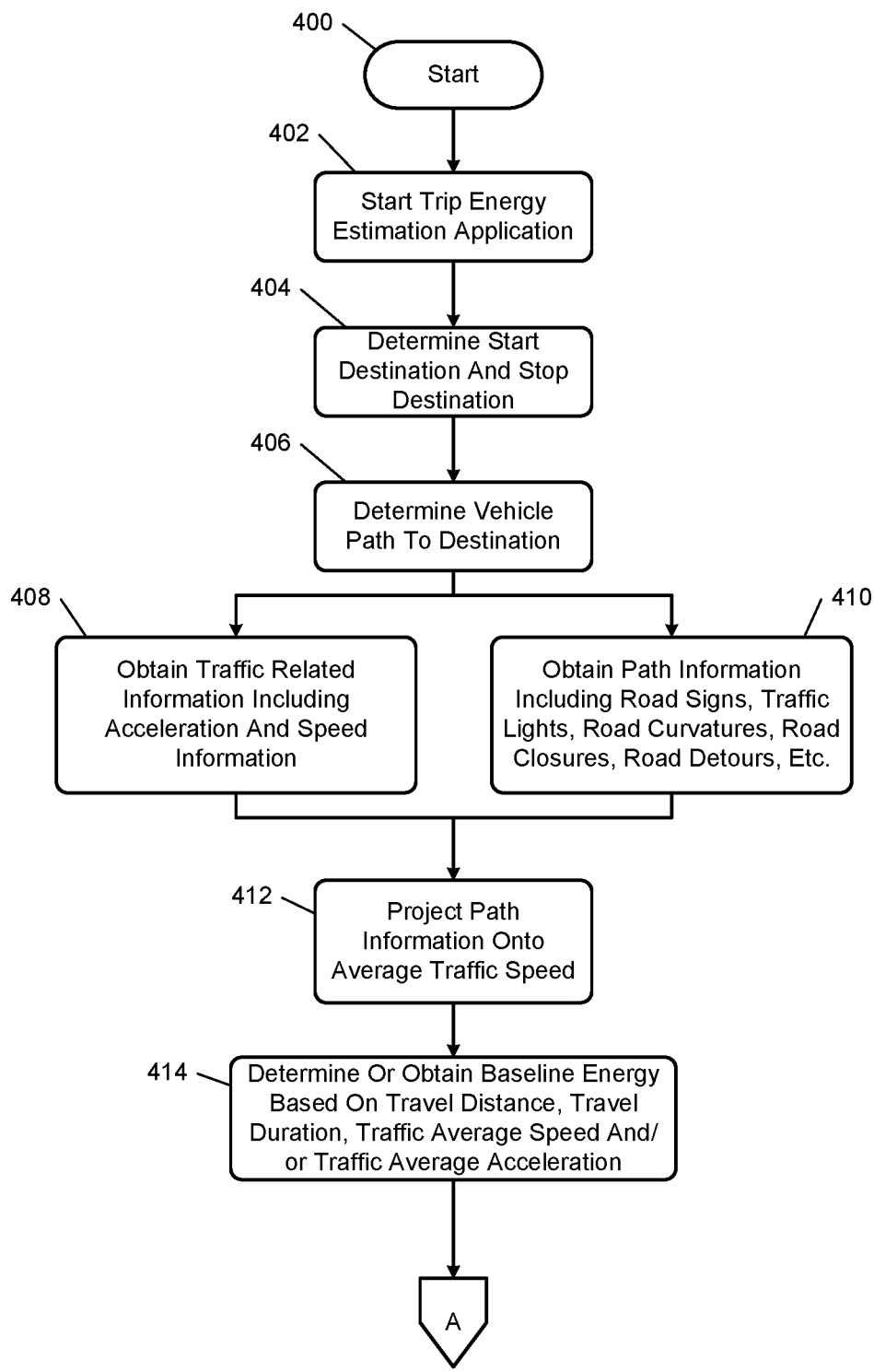
FIGS. 4A-4B illustrate a method of estimating trip energy for a particular driver and indicating charge related information according to the present disclosure
Figure 4B:
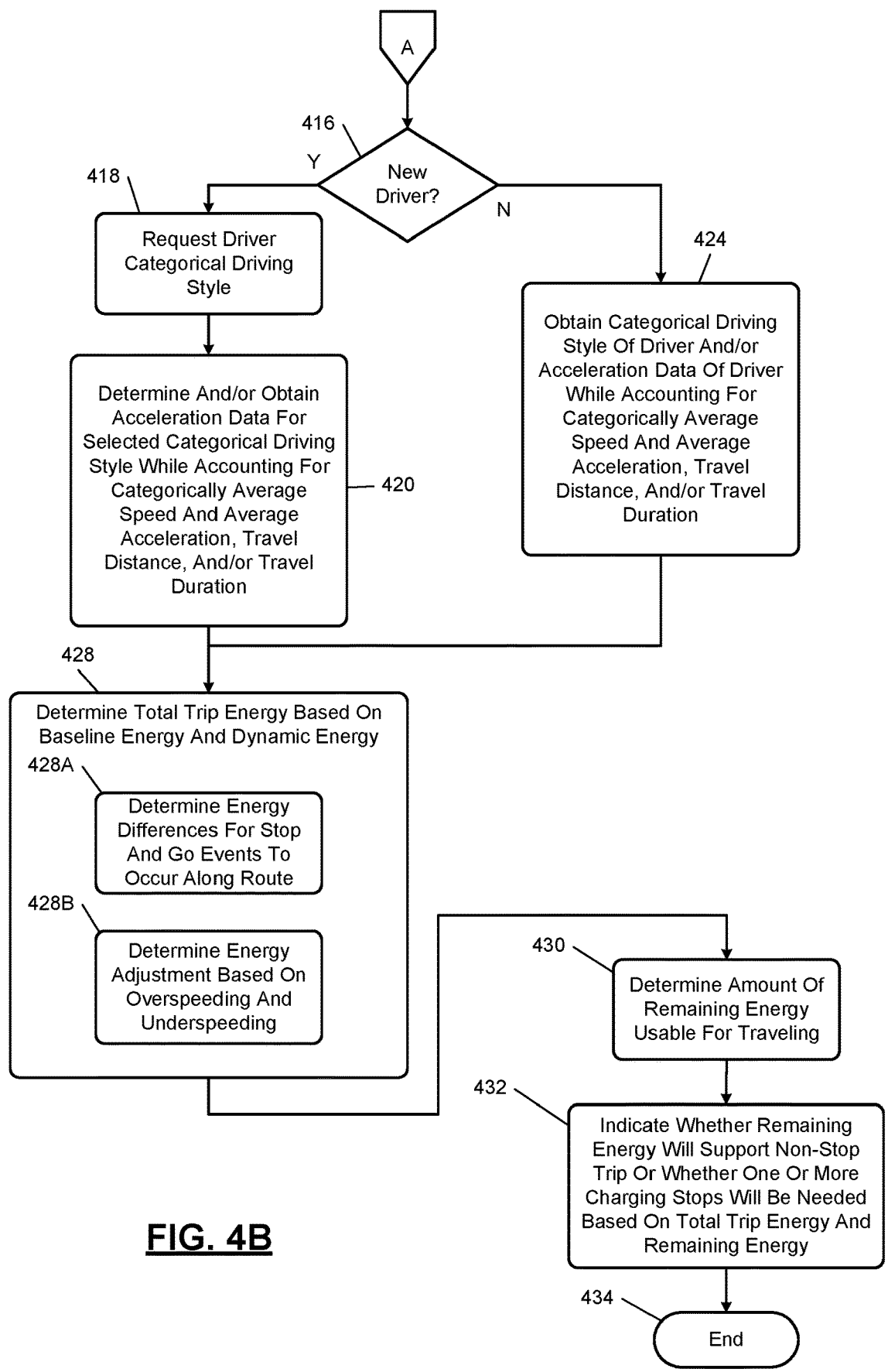

FIGS. 4A-4B shows a method of estimating trip energy for a particular driver and indicating charge related information. The operations may be iteratively performed. The operations may be performed by one or more of the above-stated trip energy estimation modules. In one embodiment, one or more operations are performed by one of the trip energy estimation modules and the results thereof are shared with one or more of the other trip energy estimation modules.

The method may begin at 400. At 402, a trip energy estimation application may be started. This may include, for example, a driver selecting the application on the display 320 of FIG. 3 or on another display of the vehicle 106 or on the display 166 of the portable network device 108. This may include providing inputs to, for example, the navigation module 327.

At 404, start and stop destinations are determined for a trip. This may include receiving inputs from a driver indicating that the trip is to start, for example, where the vehicle is currently located (referred to as Point A), and providing the stop destination (referred to as point B).

At 406, the navigation module 327 of the vehicle, one of the trip energy estimation modules, and/or the control module 160 of the portable network device 108 may determine one or more paths to travel from Point A to Point B. The navigation module 327 of the vehicle, one of the trip energy estimation modules, the control module 160 or the driver may select one of the possible paths. As an example, the path having the shortest drive time and/or least amount of traffic may be selected.

In one embodiment, the path is selected after performing operations 412, 414, 416, 418, 420, 424, 428 and based on predicted energy usage determined for each possible path. The path that requires the least amount of energy usage may be selected. This selection may be performed by one of the stated modules. The control module 160 may then, if the vehicle 106 is a partially or fully autonomous vehicle, assist, direct, and/or cause the vehicle to driver from Point A to Point B.

At 408, traffic related information including acceleration and speed information may be collected. This may include average traffic speeds and acceleration data for the one or more paths. This may also include average speeds and acceleration for the driver while traveling along the one or more paths. This information may be collected at the vehicle 106 and/or the portable network device 108 and may be received from the cloud-based network device. This may include the data 120, 122, 126, 128.

At 410, path related information including locations and types of road signs, locations of stop signs, locations and types of signal lights, locations of traffic congestion, locations and types of road curvatures, locations of road closures, locations of road detours, etc. The path information may be collected at the vehicle 106 and/or the portable network device 108 and may be received from the central station 104, where the information may be stored in the map database 146.

Figure 9:
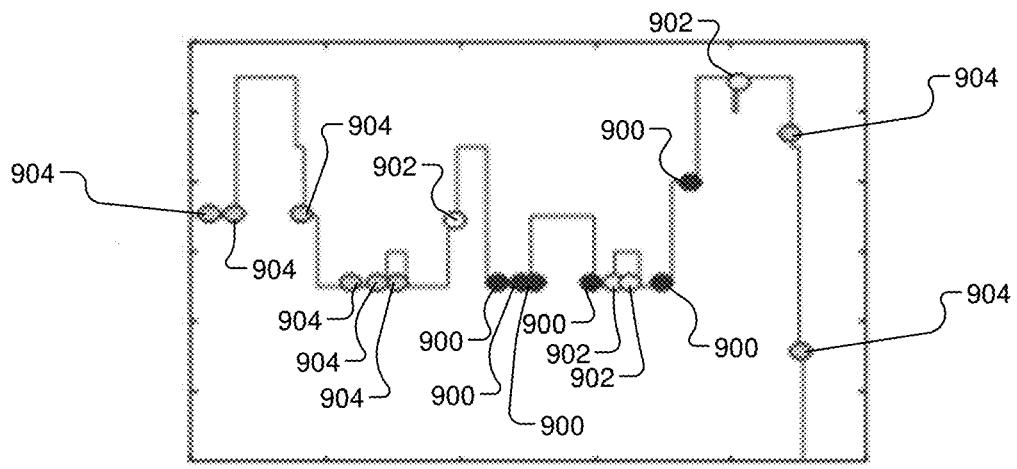
FIG. 9 is an example plot of path information projected on average traffic speed according to the present disclosure.

At 412, the path information is projected onto average traffic speed information. As an example, the path information may be plotted along an average traffic speed curve, as shown in FIG. 9. This is done to correlate average traffic speeds to objects, conditions, and/or road changes that cause stop and go events.

Figure 5:
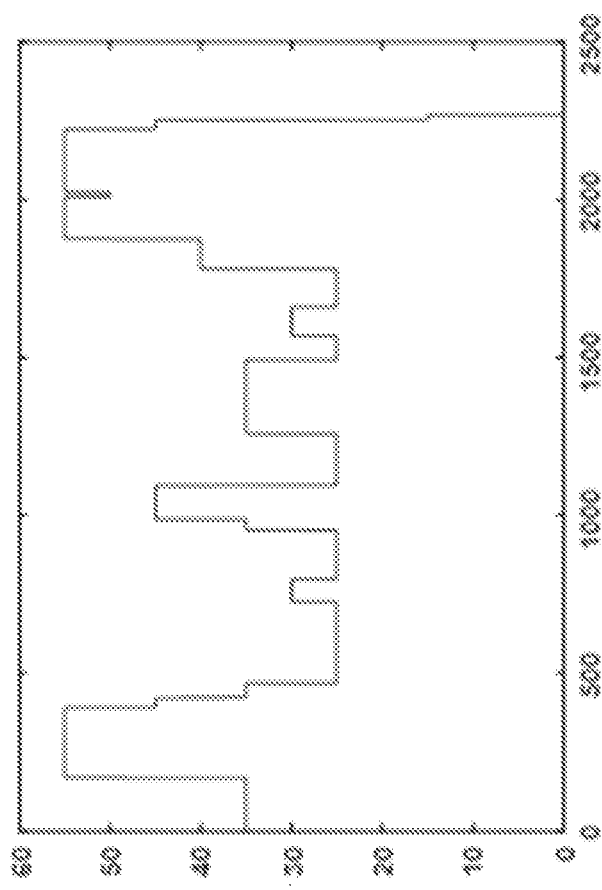
FIG. 5 is an example plot of average traffic speed along a route.

At 414, the baseline energy $E_{base}$ for each of the one or more paths is determined and/or obtained. This may be based on a travel distance between start (or beginning) and stop (or end) destinations, travel durations, traffic average speed, and traffic average acceleration. FIG. 5 shows a plot of average traffic speed along a route. The baseline energy $E_{base}$ may be determined according to equation 1, where M is vehicle mass, $f_o$ is a rolling resistance coefficient, $f_1$ is road friction, $f_2$ is air drag, v is vehicle speed, a is mean acceleration of traffic along the route, g is gravity, and θ is the road grade (i.e. angle of inclination or declination). The vehicle speed v is the average traffic speed at any location along the route. The mean acceleration is the average traffic acceleration a for the duration of the route. The baseline energy $E_{base}$ may be based on the travel duration and/or travel distance.

$$E_{base} = \int [Ma + (f_o + f_1 v + f_2 v^2) + Mg \sin(\theta)] v \, dt \quad (1)$$

Figure 6:
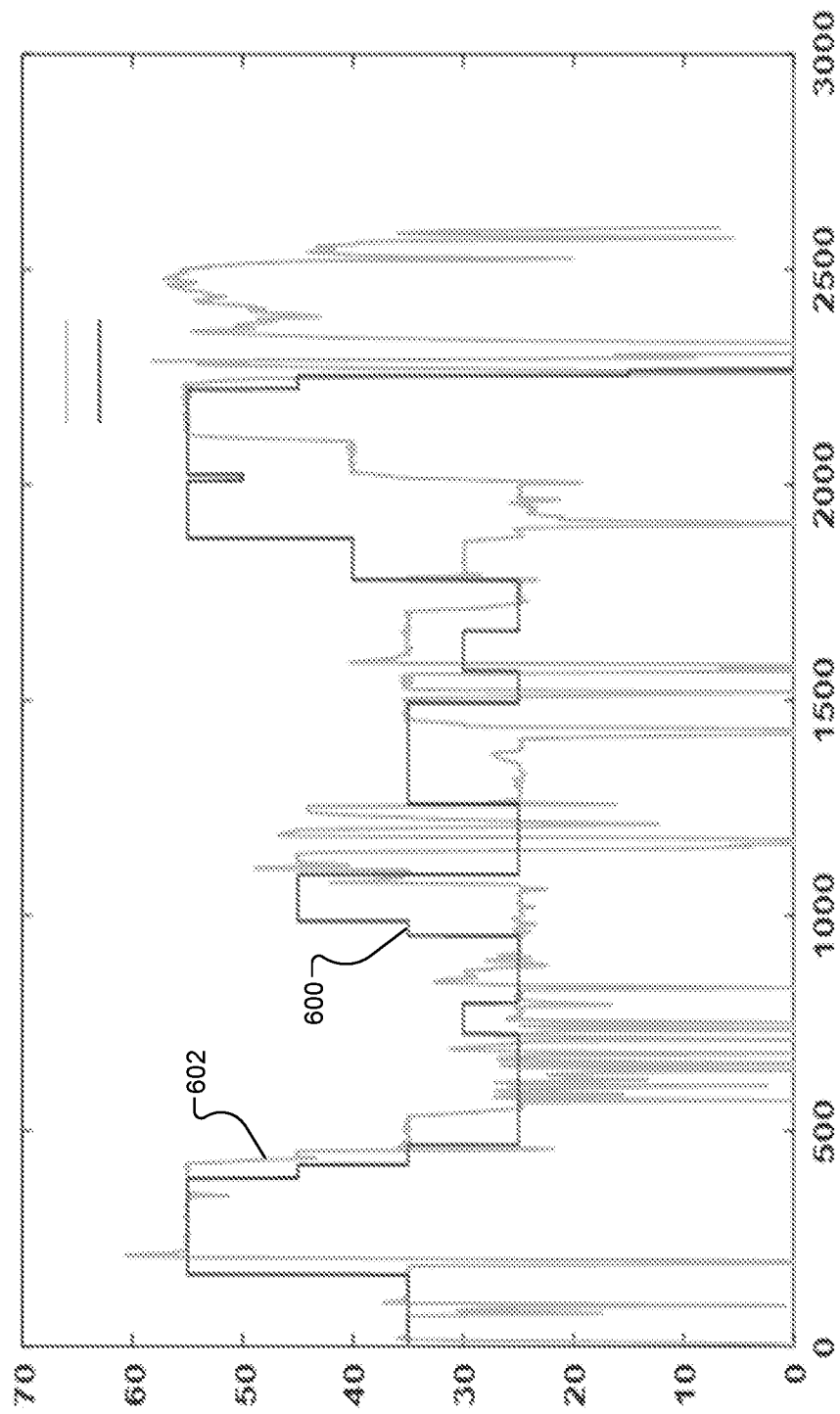
FIG. 6 is an example plot of actual speed of a vehicle driven by a particular driver versus predicted or known average traffic speed.

FIG. 6 shows a plot of actual speed 600 of a vehicle, such as the vehicle 106 being driven by the driver versus a predicted or known average traffic speed 602. As shown, the actual driving speed 600 of the vehicle (referred to as the driver speed) is substantially different from the average traffic speed 602. The average traffic speed 602 does not include stop and go events, as does the actual driving speed 600. This plot is an example of a conservative driver that is exhibiting multiple vehicle stop and go events. These stop and go events are associated with traffic signs, stop lights, turns, etc.

To capture energy associated with the differences between the actual driving speed 600 and the average traffic speed 602, a driver model that includes both baseline energy and dynamic energy is utilized. The dynamic energy accounts for (i) different acceleration driving style of the driver, (ii) stop and go events experienced by the driver while traveling along the route, and (iii) over speeding and/or under speeding of the driver.

At 416, the trip energy estimation module may determine whether the driver is a new driver, whether a categorical driving style is known for the driver, and/or whether vehicle speed and acceleration data have been collected for the driver. If yes, operation 418 may be performed, otherwise 424 may be performed.

At 418, the trip energy estimation module may display a screen asking the categorical driving style of the driver. The driver may then indicate, for example, whether the driver is a sporty (or aggressive) driver, a normal (or average) driver, or a conservative (or economical) driver. Any number of different categorical driving styles may be provided to choose from.

At 420, acceleration associated with the driver driving the vehicle 106 from start and stop destinations along the one or more paths is obtained and/or determined. This data may be retrieved from memory based on the categorical driving style or the driver's acceleration style learned from his previous driving data. This is accomplished while accounting for the selected categorical driving style, an average driving speed for that driving style, an average acceleration for that driving style, travel distance, and/or travel duration.

At 424, stored categorical driving style and/or acceleration data of the driver is obtained and/or determined for the driver driving the vehicle 106 from the start and stop destinations along the one or more paths is determined. This may include the average acceleration known or estimated for the driver for the one or more paths. The acceleration data is obtained and/or determined while accounting for the selected categorical driving style, an average driving speed for that driving style, an average acceleration for that driving style, travel distance, and/or travel duration. The acceleration data may be collected and/or learned data based on a driving history of the driver. The acceleration data may be average acceleration data associated with the driver previously driving along the one or more paths and/or associated with the driving along one or more other paths. The trip energy estimation module may continuously monitor, track and store vehicle speed and acceleration data of the driver and perform statistical learning of these parameters for current and subsequent use in estimating the acceleration data and/or averages associated with the driver.

Figure 7:
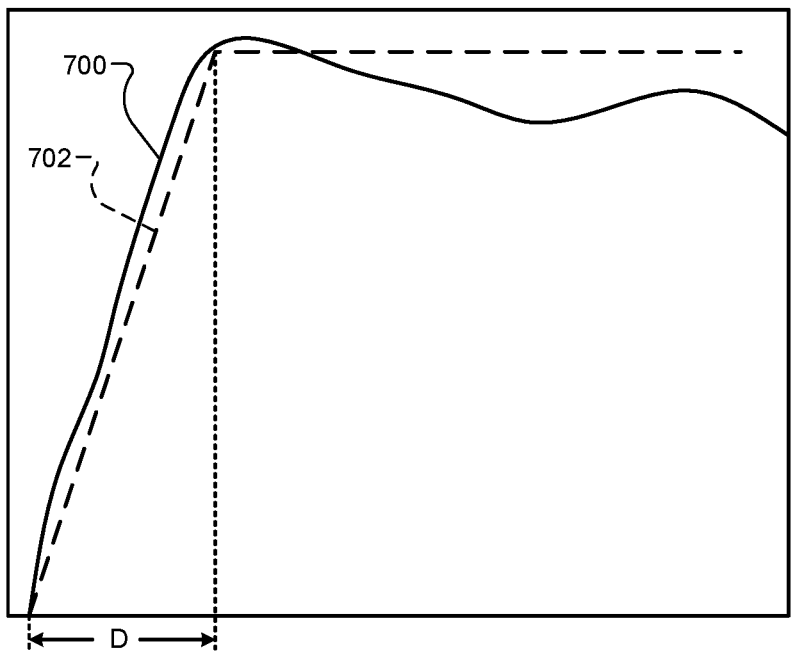
FIG. 7 is an example plot of vehicle speed of a driver versus an average speed for acceleration estimation of the driver according to the present disclosure.

As an example, statistical learning of the driver's acceleration may be performed based on vehicle speed versus time plots. FIG. 7 shows a plot of vehicle speed 700 of the driver versus an average speed 702 for the driver illustrating one acceleration event. The slope of the vehicle speed 700 is the vehicle acceleration. The energy used during the acceleration event of FIG. 7 may be represented by equation 2.

$$E_{accel} = M \int_0^D \frac{dV}{dt} dx = MD\left(\frac{1}{n}\Sigma\frac{dVi}{dt}\right) \quad (2)$$

where M is vehicle mass, D is the traveled distance during this acceleration period.

The acceleration of the vehicle 106 as driven by the driver (referred to as the driver acceleration a) may be determined using, for example, equation 3. The multiple derivatives of vehicle speeds or accelerations over the distance D may be determined, where i refers to a vehicle speed derivative calculated at time interval i, t is time, and n indicates the number of the accelerations calculated during the traveled distance D.

$$a_{60kPh} = \frac{1}{n}\Sigma\frac{dVi}{dt} \quad (3)$$

Figure 8:
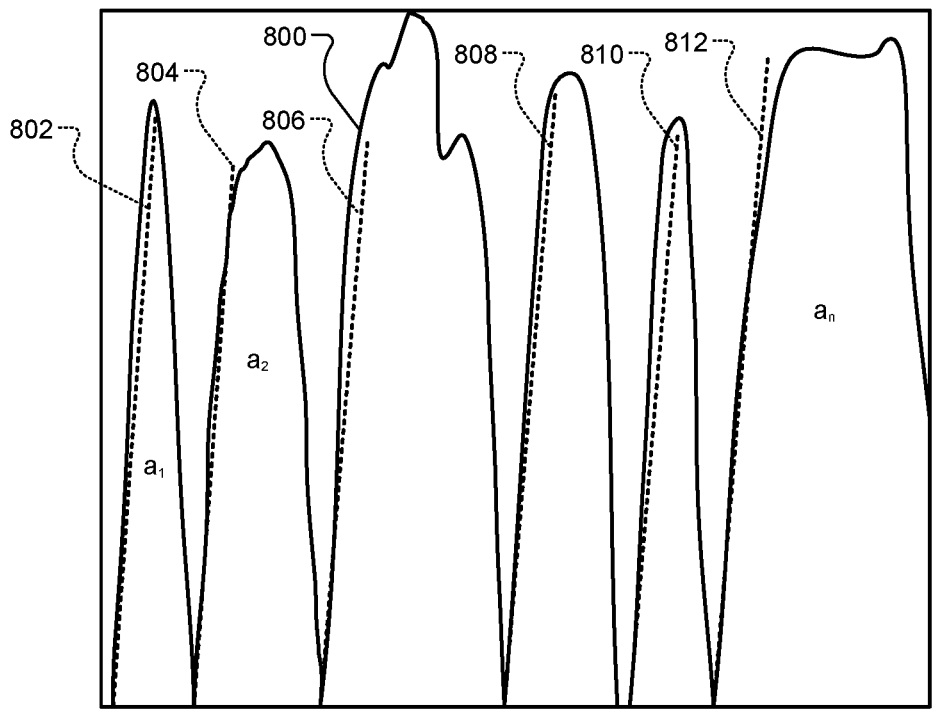
FIG. 8 is an example plot of vehicle speed and accelerate speed lines according to the present disclosure.

FIG. 8 shows a plot of vehicle speed 800 and averaged accelerate speed (lines 802, 804, 806, 808, 810, 812) over time for acceleration estimation. The plot of vehicle speed 800 is shown having multiple acceleration and deceleration events. Lines 802, 804, 806, 808, 810, 812 represent average slopes of the acceleration portions of these events. The average slopes are indicative of the accelerations $a_1, a_2, \ldots, a_n$ for these events. As an example, the statistic acceleration estimation from 0-35 kilometers-per-hour (kph) may be represented by equation 4.

$$a_{35kPh} = \frac{1}{n}\Sigma a_j \quad (4)$$

A recursive algorithm to learn the driver's acceleration may be implemented. The recursive algorithm may include generation of average accelerations for each categorical driver style. Table 1 shows an example of average accelerations for different vehicle speeds in kilometers-per-hour (kph) for aggressive, normal and economical categorical driving styles. Mean accelerations $A_{agg}, A_{norm}, A_{eco}$ for each categorical driving style are also included.

TABLE 1

Driver Categorical Average Acceleration

| Driver Style | 40 kph | 60 kph | 90 kph | Mean Acceleration |
|---|---|---|---|---|
| Aggressive | $A11_0$ | $A12_0$ | $A13_0$ | $A_{agg}$ |
| Normal | $A21_0$ | $A22_0$ | $A23_0$ | $A_{norm}$ |
| Economical | $A31_0$ | $A32_0$ | $A33_0$ | $A_{eco}$ |

The acceleration values of Table 1 may be determined using, for example, equation 5, where $A_n$ is the nth mean acceleration from 0-X mph, X is the top vehicle speed, and $a_n$ is the latest (or new) acceleration. If $$\frac{n-1}{n} \cong 1, \text{ then } A_n = A_n - 1.$$

$$A_n = \frac{n-1}{n}A_{n-1} + \frac{a_n}{n} \quad (5)$$

The accelerations A11, A12, A13, A21, A22, A23, A31, A32, A33 are accelerations adaptively learned that may be represented using equation 6. The learning may begin when there is a small amount of acceleration data available and c=1. As additional acceleration data is collected, c gradually decreases to 0, which at this point the original (or first) acceleration data $A_0$ is no longer used. The original acceleration data $A_0$ may be referred to as the default acceleration.

$$A = cA_0 + (1-c)A_n \quad (6)$$

If n<10, then c=1, otherwise if n>10, then c=c−0.1 and if c<0, then c=0. In another embodiment, each driver has a dedicated lookup table of acceleration values.

At 428, the total trip energy based on the baseline energy and the dynamic energy is determined for each of the one or more paths (or routes). The total trip energy for each trip may be determined using equation 7, where: $a_i$ is the mean acceleration for the driver i for a given period of time and/or at least a portion of a route; and $v_i$ may be either (a) the mean vehicle speed for the driver i for a given period of time and/or at least a portion of a route, or (b) the changing vehicle speed for the driver i along the route.

$$E_{total} = E_{base} + E_{dynamic}(a_i, v_i) \quad (7)$$

At 428A, a dynamic driver model may be used that is based on learned personalized acceleration. As an example and as stated above, path information may be collected from the map database 146 and projected onto a plot of average traffic speed to identify where stop and go events may occur. The dynamic driver model may then apply learned driver acceleration information for the stop and go event locations along the route to determine energy differences at these points. FIG. 9 shows traffic light dots 900, stop sign dots 902, and turn dots 904 overlaid on a plot of average traffic speed along a route. The dots 900, 902, 904 indicate where stop and go events are to occur. The additional energy ΔE used at each of the stop and go events may be determined and may be based on the categorical acceleration of the driver. Table 2 shows the additional energy for different speeds and different categorical accelerations. As an example, $a_{agg}$ may equal 2 meters per second squared m/s², $a_{norm}$ may equal 1.2 m/s², and $a_{eco}$ may equal 1.0 m/s².

TABLE 2

Driver Energy Differences Versus Baseline Energy

| Driver Acceleration | 0-25 mph | 0-35 mph | 0-45 mph | 0-55 mph |
|---|---|---|---|---|
| $a_{agg}$ | ΔE11 | ΔE12 | ΔE13 | ΔE14 |
| $a_{norm}$ | ΔE21 | ΔE22 | ΔE23 | ΔE24 |
| $a_{eco}$ | ΔE31 | ΔE32 | ΔE33 | ΔE34 |

The total energy may then be determined using a modified version of equation 7, where the dynamic energy $E_{dynamic}$ is a sum of the energy differences associated with each of the stop and go locations j, as represented by equation 8.

$$E_{total} = E_{base} + E_{dynamic}, \text{ where } E_{dynamic} = \Sigma E_{i,j} \quad (8)$$

Figure 10:
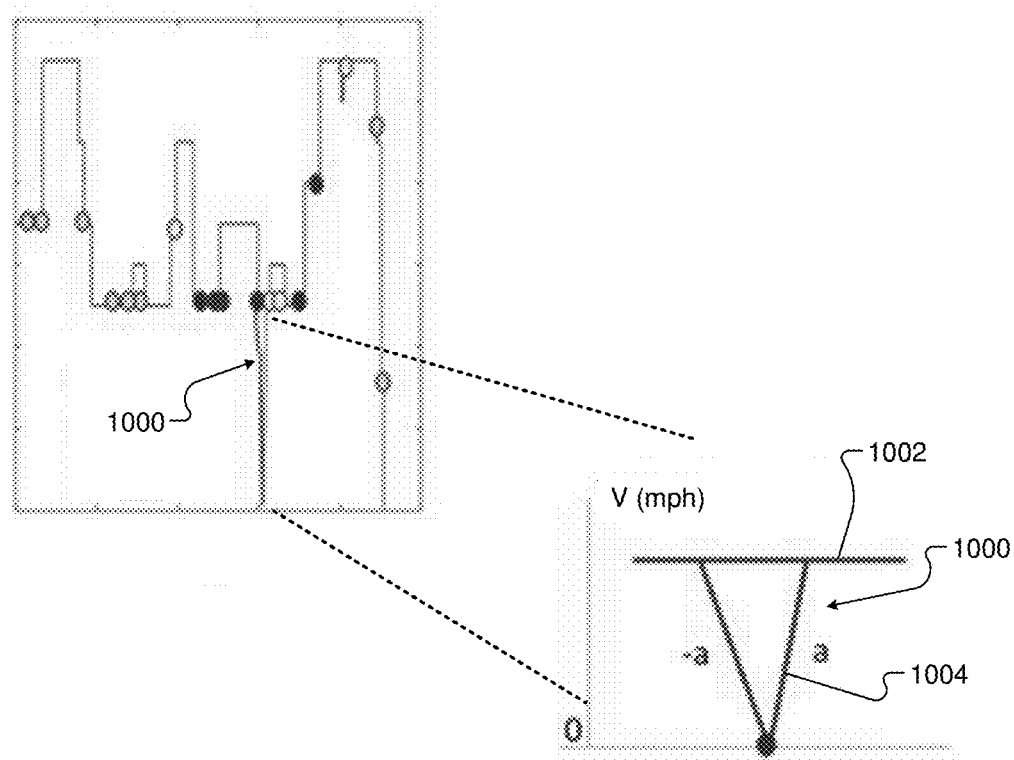
FIG. 10 includes the plot of FIG. 9 and illustrates deceleration and acceleration associated with a stop and go event.

FIG. 10 shows the plot of FIG. 9 illustrating deceleration and acceleration associated with a stop and go event 1000. The difference between the average traffic speed 1002 and the actual speed 1004 of the vehicle 106 during the deceleration −a and acceleration a is illustrated. Each driver's acceleration is learned and may be used to interpolate between values in a table (e.g., table 2) to estimate dynamic energy (or stop and go energy) values $\Delta E_{i,j}$ based on stop and go locations and vehicle speeds for each driver i. The dynamic energy values $\Delta E_{i,j}$ may be estimated directly from a vehicle model. Thus, when for example a driver's acceleration falls between two categorical acceleration values, interpolation may be used to determine the dynamic energy values $\Delta E_{i,j}$. For example if a driver's average acceleration is a value between an aggressive categorical acceleration value and a normal categorical acceleration value, then interpolation may be performed between the dynamic energy values $\Delta E_{i,j}$ corresponding to the aggressive categorical acceleration value and the normal categorical acceleration value for a particular vehicle speed range. This minimizes the amount of stored data instead of storing separate energy values for each driver. In another embodiment, each driver can use a vehicle model and the driver's associated average acceleration to calculate dynamic energy values $\Delta E_{i,j}$.

Figure 11:
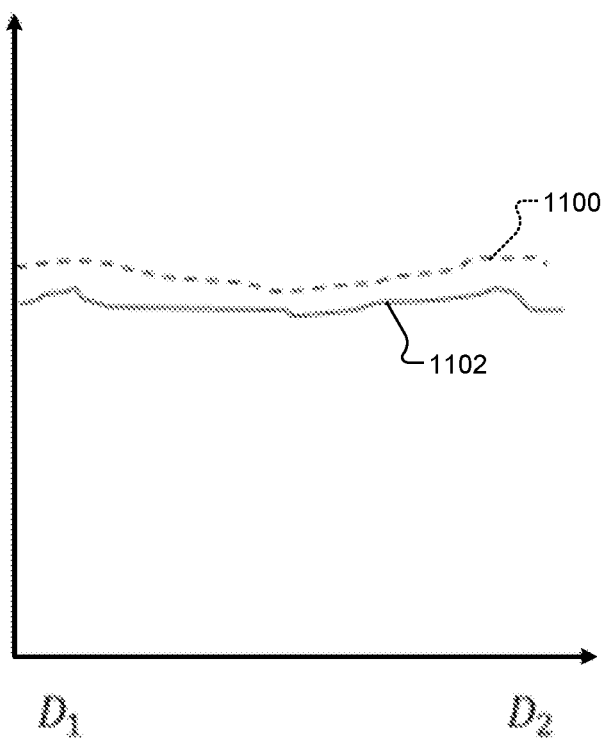
FIG. 11 is an example plot of vehicle speed versus distance illustrating over speed behavior of a driver.

At 428B, energy adjustment values are determined to account for over speeding and under speeding as compared to a categorical normal (or average) driver. Table 3 shows example amounts of increases in energy associated with over speeding by 5 mph and 10 mph for different vehicle speeds. FIG. 11 shows a plot of actual vehicle speed 1100 versus distance illustrating over speed behavior of a driver. An average traffic speed curve 1102 is shown. In the example of FIG. 11, the driver is over speeding by 5 mph along a route relative to the average traffic speed along the route.

TABLE 3

Increased Energy Due to Over Speeding

| Exceed Speed Limit | 35 mph | 45 mph | 55 mph | 65 mph | 70 mph |
|---|---|---|---|---|---|
| 5 mph | 28% | 24.7% | 21.7% | 19% | 18% |
| 10 mph | 60% | 53% | 46% | 41% | 39% |

Equation 7 may be modified, as provided by equation 9, to account for the difference in speed, where $E_{dynamic}$=% Energy Increase*$E_{base}$ (e.g., $E_{dynamic}$=0.18$E_{base}$ such that $E_{total}$=1.18$E_{base}$).

$$E_{total}=E_{base}+E_{dynamic}, \text{ where } E_{dynamic}=\% \text{ Energy Increase}*E_{base} \qquad (9)$$

In an embodiment, operations 428A and 428B are performed in combination such that the total energy is determined based on (i) the energy associated with the stop and go events, and (ii) the energy associated with over speeding and under speeding. This may include determining the dynamic amount of energy by summing the energy associated with the stop and go events and the adjustment in energy associated with over speeding and under speeding for each individual driver.

At 430, an amount of remaining energy permitted for propulsion usage may be determined. This may include determining the state of charge of cells and/or battery packs.

At 432, an indication may be provided indicating a trip estimate such as whether the remaining energy will support a non-stop trip or whether one or more charging stops will be needed based on the total trip energy and the remaining energy. The indication may be provided to the vehicle operator via, for example, the display 320. Other trip estimates may include indications of when charging will be needed and distances that can be traveled on current state of charge based on the driver's driving style. As stated above, a path may be selected and followed based on the estimated trip energy for that path and/or various other operations may be performed based on the total trip energy and the remaining energy.

Trip planning is important for electric vehicle owners, although the number of electric vehicle charging stations is ramping up, it is still far more less than the number of gas stations, and also charging for each electric vehicle can take 20 minutes to an hour. The disclosed embodiments assist an electric vehicle owner to plan a trip from departure to destination more accurately based on his/or her own driving style, whether to stop somewhere based on charging station availability, or take a direct journey to arrive at a destination. Based on a determined electric vehicle owner's driving style, determined routes and determined traffic levels along the routes, the disclosed embodiments also allow a driver to select the most energy efficient route among the several route options. The control module 250 of FIG. 1 may also compare a learned individual's driver style with an average population driving style, and provide advice on how to improve acceleration rates and follow traffic speed limits to increase mileage.

The control module 250 of FIG. 3 may perform various operations based on the total trip energy and the remaining energy. For example, when operating in an non-autonomous, semi-autonomous, and/or fully-autonomous driving mode, the control module may control amount of power consumed over duration of a trip including: determining, setting, and/or limiting vehicle acceleration rates; determining which electronic devices are able to be enabled and run; determining which electric devices to turn on and/or permit operation thereof; determining which electrical load requests to satisfy prior to satisfying other electrical load requests; etc.

Automatic navigation/cruise control operations may be performed based on energy usage estimations and predictions and driving behaviors of the vehicle operator and/or behaviors of vehicle when in a semi-autonomous or fully-autonomous driving mode. For example, automatic cruise control speeds may be limited to be within a certain range in order to minimize energy usage and extend drive time and/or distance traveled. Determining which driving operations and the extent to which the operations are to be performed can be difficult without knowing an estimate of the total trip energy needed and the amount of remaining trip energy. By performing the embodiments disclosed herein including determining this information, the stated issues are resolved and the control module 250 is able to perform the above-stated operations. The disclosed embodiments effectuate improvements in the technical fields of non-autonomous, semi-autonomous and fully autonomous vehicle operation and control and related implementations as disclosed and described herein. Subsequent to operation 432, the method may end at 434.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events. This information may be indicated on one or more of the above-stated displays.

Table 4 shows an example of error results using the above-described trip energy prediction method. As shown in Table 4, the total estimated energy for each categorical driver is 2% or less as compared to the baseline energy.

TABLE 4

Example Error Results With Trip Energy Prediction Method Implemented

| kWh | Aggressive | Normal | Economical |
|---|---|---|---|
| Actual Energy | 4.255 | 4.167 | 3.777 |
| Baseline Energy | 3.9561 | 3.9561 | 3.9561 |
| | (7% err) | (5% err) | (−5% err) |
| Dynamic Energy | 0.2983 | 0.2545 | −0.2551 |
| Total Energy | 4.2544 | 4.2106 | 3.701 |
| | (0.01% err) | (1%) | (2%) |

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A trip energy estimation system comprising:
   a memory configured to store average traffic speed data, average traffic acceleration data, driver speed data, and driver acceleration data, wherein the driver speed data and the driver acceleration data are historical data specific to a particular driver; and
   a control module configured to execute an algorithm to estimate an amount of energy for an electric vehicle to travel from a first location to a second location, the algorithm comprising
      determining, based on the average traffic speed data and the average traffic acceleration data, a baseline amount of energy for the electric vehicle to travel from the first location to the second location,
      determining, based on the driver speed data and the driver acceleration data, a dynamic amount of energy based on (i) stop and go events, (ii) over speeding, and (iii) under speeding, wherein the dynamic amount of energy is based on historical over speeding and under speeding behavior of the particular driver as compared to average traffic speed and average traffic acceleration rates, and
      determining a total amount of energy based on the baseline amount of energy and the dynamic amount of energy,
   wherein the control module is configured
      based on the total amount of energy, to perform operations including indicating a trip estimate, and
      to perform the operations to minimize energy usage and extend at least one of drive time and distance traveled, the operations including i) limiting an acceleration rate of the electric vehicle, ii) selecting which electrical load requests to satisfy, and iii) enabling selected electronic devices of the electric vehicle corresponding to the selected electrical load requests to satisfy.

2. The trip energy estimation system of claim 1, wherein the control module is configured to determine the dynamic amount of energy for the stop and go events, over speeding and under speeding.

3. The trip energy estimation system of claim 1, wherein the control module, in determining the dynamic amount of energy for the stop and go events:
   projects path information onto a plot of average traffic speed;
   determines, based on the projection, how many stop and go events occur along a route from the first location to the second location;
   sums up energy associated with decelerating and accelerating associated with each of the stop and go events to provide a sum; and
   determines the dynamic amount of energy based on the sum.

4. The trip energy estimation system of claim 1, wherein the control module, in determining the dynamic amount of energy for at least one of the over speeding or the under speeding:
   determines differences between the average traffic speed data and the driver speed data;
   determines, based on the differences, percentage increases or percentage decreases in the dynamic amount of energy; and
   determines the dynamic amount of energy based on the percentage increases or percentage decreases.

5. The trip energy estimation system of claim 1, wherein the control module, in determining the dynamic amount of energy:
   projects path information onto a plot of average traffic speed;
   determines, based on the projection, a number of stop and go events;
   sums up the energy associated with decelerating and accelerating associated with each of the stop and go events to provide a sum;
   determines differences between the average traffic speed data and the driver speed data;
   determines, based on the differences, percentage increases or percentage decreases in a dynamic amount of energy; and
   determines the dynamic amount of energy based on the sum and the percentage increases or percentage decreases.

6. The trip energy estimation system of claim 1, wherein the control module is configured to:
   implement a statistical learning model of acceleration of the particular driver, wherein the particular driver is a system operator or another individual, and the statistical learning model of acceleration is specific to the particular driver for different routes traveled by the electric vehicle; and
   determine the dynamic amount of energy based on the statistical learning model.

7. The trip energy estimation system of claim 1, wherein the control module is configured to:
   perform a recursive algorithm to learn acceleration behavior of the particular driver, wherein the particular driver is a system operator or another individual, and the recursive algorithm to learn acceleration behavior of the particular driver includes determining acceleration behavior of the particular driver over time for different driving routes; and
   determine the dynamic amount of energy based on the learned acceleration behavior of the particular driver.

8. The trip energy estimation system of claim 1, wherein the control module is configured to:
   determine a categorical acceleration style of the particular driver, wherein the particular driver is a system operator or another individual; and
   determine the dynamic amount of energy based on the categorical acceleration style of the particular driver.

9. The trip energy estimation system of claim 1, wherein the control module is configured to:

determine an average acceleration of the particular driver;
compare the average acceleration of the particular driver to categorical acceleration values for different categorical acceleration styles to determine whether to perform interpolation;
in response to the average acceleration of the particular driver not matching one of the categorical acceleration values, perform interpolation to estimate stop and go energy levels or estimate the stop and go energy levels directly from a vehicle model; and
determine the dynamic amount of energy based on the estimated stop and go energy levels.

10. A trip energy based estimation method comprising:
obtaining average traffic speed data, average traffic acceleration data, driver speed data, and driver acceleration data, wherein the driver speed data and the driver acceleration data are historical data specific to a particular driver;
executing an algorithm to estimate an amount of energy for an electric vehicle to travel from a first location to a second location, the algorithm comprising
determining, based on the average traffic speed data and the average traffic acceleration data, a baseline amount of energy for the electric vehicle to travel from the first location to the second location,
determining, based on the driver speed data and the driver acceleration data, a dynamic amount of energy based on (i) stop and go events, (ii) over speeding, and (iii) under speeding, wherein the dynamic amount of energy is based on historical over speeding and under speeding behavior of the particular driver as compared to average traffic speed and average traffic acceleration rates, and
determining a total amount of energy based on the baseline amount of energy and the dynamic amount of energy; and
based on the total amount of energy, performing operations including indicating a trip estimate,
wherein the operations are performed to minimize energy usage and extend at least one of drive time and distance traveled, and include i) limiting an acceleration rate of the electric vehicle, ii) selecting which electrical load requests to satisfy, and iii) enabling selected electronic devices of the electric vehicle corresponding to the selected electrical load requests to satisfy.

11. The method of claim 10, further comprising determine the dynamic amount of energy for the stop and go events, over speeding and under speeding.

12. The method of claim 10, wherein determining the dynamic amount of energy for the stop and go events comprises:
projecting path information onto a plot of average traffic speed;
determining, based on the projection, how many stop and go events occur along a route from the first location to the second location;
summing up energy associated with decelerating and accelerating associated with each of the stop and go events to provide a sum; and
determining the dynamic amount of energy based on the sum.

13. The method of claim 10, wherein determining the dynamic amount of energy for at least one of the over speeding or the under speeding comprises:
determining differences between the average traffic speed data and the driver speed data;
determining, based on the differences, percentage increases or percentage decreases in the dynamic amount of energy; and
determining the dynamic amount of energy based on the percentage increases or percentage decreases.

14. The method of claim 10, wherein determining the dynamic amount of energy comprises:
projecting path information onto a plot of average traffic speed;
determining, based on the projection, a number of stop and go events;
summing up the energy associated with decelerating and accelerating associated with each of the stop and go events to provide a sum;
determining differences between the average traffic speed data and the driver speed data;
determining, based on the differences, percentage increases or percentage decreases in the dynamic amount of energy; and
determining the dynamic amount of energy based on the sum and the percentage increases or percentage decreases.

15. The method of claim 10, further comprising:
implementing a statistical learning model of acceleration of the particular driver, wherein the particular driver is a system operator or another individual, and the statistical learning model of acceleration is specific to the particular driver for different routes traveled by the electric vehicle; and
determining the dynamic amount of energy based on the statistical learning model.

16. The method of claim 10, further comprising:
performing a recursive algorithm to learn acceleration behavior of the particular driver, wherein the particular driver is a system operator or another individual, and the recursive algorithm to learn acceleration behavior of the particular driver includes determining acceleration behavior of the particular driver over time for different driving routes; and
determining the dynamic amount of energy based on the learned acceleration behavior of the particular driver.

17. The method of claim 10, further comprising:
determining a categorical acceleration style of the particular driver, wherein the particular driver is a system operator or another individual; and
determining the dynamic amount of energy based on the categorical acceleration style of the particular driver.

18. The method of claim 10, further comprising:
determining an average acceleration of the particular driver;
comparing the average acceleration of the particular driver to categorical acceleration values for different categorical acceleration styles to determine whether to perform interpolation;
in response to the average acceleration of the particular driver not matching one of the categorical acceleration values, performing interpolation to estimate stop and go energy levels or estimate the stop and go energy levels directly from a vehicle model; and
determining the dynamic amount of energy based on the estimated stop and go energy levels.

* * * * *